United States Patent
Cook et al.

[11] Patent Number: 6,023,445
[45] Date of Patent: Feb. 8, 2000

[54] DETERMINING CONTACT LEVELS OF FLUIDS IN AN OIL RESERVOIR USING A RESERVOIR CONTACT MONITORING TOOL

[75] Inventors: Gary R. Cook, Highlands Ranch; Robert A. Daly, Englewood, both of Colo.; James D. Fischer, Midland, Tex.

[73] Assignee: Marathon Oil Company, Findlay, Ohio

[21] Appl. No.: 09/191,628

[22] Filed: Nov. 13, 1998

[51] Int. Cl.[7] .................................................. G01V 1/40
[52] U.S. Cl. ...................... 367/83; 340/854.3; 340/854.4
[58] Field of Search ...................... 367/83, 35; 73/64.55, 73/152.18, 152.55, 152.58, 290 V, 151; 181/102, 105

[56] References Cited

U.S. PATENT DOCUMENTS

| | | | |
|---|---|---|---|
| 1,133,218 | 3/1915 | Beecher | 73/155 |
| 1,555,800 | 9/1925 | Huber | 73/155 |
| 1,889,889 | 12/1932 | Ennis | 73/155 |
| 3,246,145 | 4/1966 | Higgins | 250/43.5 |
| 3,248,938 | 5/1966 | Hill et al. | 73/155 |
| 3,454,085 | 7/1969 | Bostock | 166/6 |
| 3,603,145 | 9/1971 | Morris | 73/155 |
| 3,776,032 | 12/1973 | Vogel | 73/155 |
| 4,215,567 | 8/1980 | Vlcek | 73/61.1 |
| 4,312,049 | 1/1982 | Masse et al. | 367/35 |
| 4,934,186 | 6/1990 | McCoy | 73/151 |
| 5,138,585 | 8/1992 | Angehrn et al. | 367/86 |
| 5,237,857 | 8/1993 | Dobson et al. | 73/61.44 |
| 5,357,482 | 10/1994 | O'Sullivan et al. | 367/35 |
| 5,408,874 | 4/1995 | Fleck, Sr. et al. | 73/290 |
| 5,535,625 | 7/1996 | Levy | 73/290 |
| 5,553,034 | 9/1996 | Jones et al. | 367/25 |
| 5,592,438 | 1/1997 | Rorden et al. | 367/83 |
| 5,621,169 | 4/1997 | Harris et al. | 73/152.18 |
| 5,747,749 | 5/1998 | Bednarczyk et al. | 181/102 |
| 5,812,068 | 9/1998 | Wisler et al. | 340/855.5 |

*Primary Examiner*—Christine K Oda
*Assistant Examiner*—Victor J. Taylor
*Attorney, Agent, or Firm*—Jack E. Ebel

[57] ABSTRACT

The present invention is a method for monitoring contact levels of fluids in a subterranean oil reservoir. A monitoring wellbore is provided from an earthen surface into the oil reservoir which includes an oil zone, a water zone, and a gas zone, each having a level in the reservoir. The monitoring wellbore contains a plurality of fluids including an oil phase, a water phase and a gas phase, each have a level in the monitoring wellbore which substantially corresponds to the level of the oil, water and gas zones, respectively, in the reservoir proximal to the monitoring wellbore. The method includes positioning a transducer pair having a first and a second transducer in the oil phase of the monitoring wellbore, transmitting a plurality of first acoustic output signals from the first transducer in a first direction and transmitting a plurality of second acoustic output signals from the second transducer in a second direction. A gas/oil interface is contacted with one of the first acoustic output signals and a first acoustic input signal is reflected back to the first transducer in response to the contact. A contact level of the oil and gas zones is determined from the first acoustic input signal. A water/oil interface is contacted with one of the second acoustic output signals and a second acoustic input signal is reflected back to the second transducer in response to the contact. A contact level of the oil and water zones is determined from the second acoustic input signal. The transducer pair is continuously maintained in the monitoring wellbore during a long-term monitoring period and determination of the contact levels is periodically repeated throughout the long-term monitoring period.

25 Claims, 2 Drawing Sheets

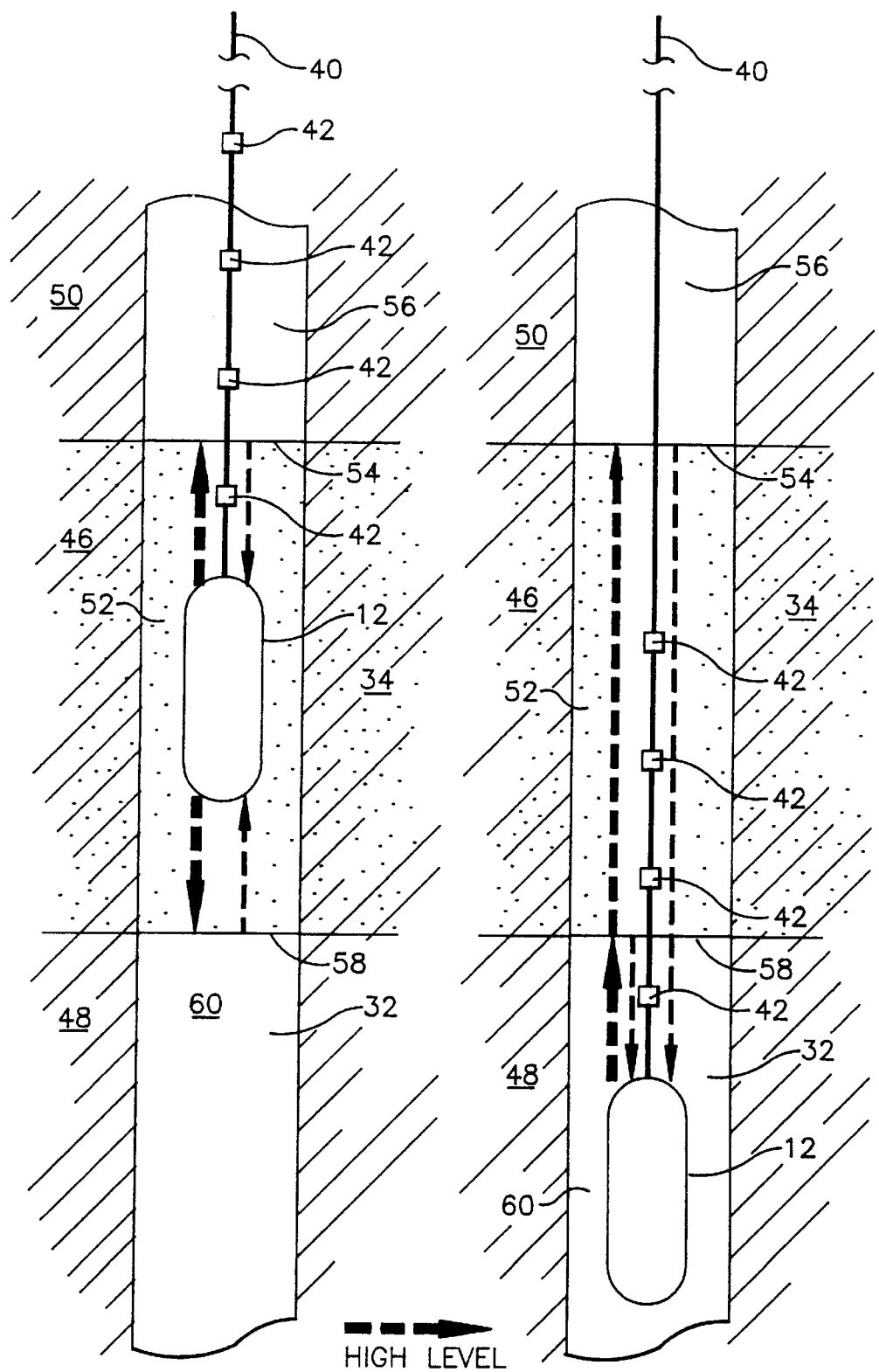

DETERMINING CONTACT LEVELS OF FLUIDS IN AN OIL RESERVOIR USING A RESERVOIR CONTACT MONITORING TOOL

TECHNICAL FIELD

The present invention relates generally to a method for managing production from an oil reservoir and, more particularly, to a method for monitoring contact levels of fluids in an oil reservoir and utilizing the contact levels as parameters for managing production from the reservoir.

BACKGROUND OF THE INVENTION

Wellbores are conventionally logged to determine rock and fluid properties of subterranean hydrocarbon-bearing formations traversed by the wellbore. The resulting information can be used to better manage production of hydrocarbons from the formation. U.S. Pat. No. 4,312,049 discloses a method employing acoustic logs to identify the gas, oil and water zones in a subterranean formation. Acoustic logging is typically performed in production or injection wells as disclosed in U.S. Pat. No. 4,934,186. However, such well logging activities can be disruptive to the day to day hydrocarbon production operations due to placement of the logging tool in the wellbore being logged. The present invention recognizes a need for a method of locating the contact levels of oil, gas and water zones in an oil reservoir and continuously monitoring the reservoir contact levels over an extended period of time without substantially disrupting oil production from the reservoir.

Accordingly, it is an object of the present invention to provide a method for effectively monitoring contact levels of oil, gas and water zones in an oil reservoir. It is another object of the present invention to continuously monitor the reservoir contact levels over an extended period of time. It is a further object of the present invention to monitor reservoir contact levels without substantially disrupting oil production from the reservoir. It is yet another object of the present invention to monitor reservoir contact levels over an extended period of time by means of a tool requiring little user intervention. It is still another object of the present invention to monitor reservoir contact levels at a plurality of locations in the reservoir over an extended period. It is a further object of the present invention to transmit reservoir contact levels obtained from a plurality of locations in the reservoir to a remote central management office for use by the operator. It is another object of the present invention to use the reservoir contact levels obtained from a plurality of locations to manage production of oil from the reservoir via a plurality of production wells. These objects and others are achieved in accordance with the invention described hereafter.

SUMMARY OF THE INVENTION

The present invention is a method for monitoring contact levels of fluids in a subterranean oil reservoir. The method provides a monitoring wellbore extending from an earthen surface into the reservoir. The monitoring wellbore is preferably a dedicated monitoring wellbore separate from any production or injection wells penetrating the reservoir. The reservoir includes an oil zone, a water zone, and a gas zone, each having a level in the reservoir. The monitoring wellbore is in fluid communication with the oil, water and gas zones and contains a plurality of fluids including an oil phase, a water phase and a gas phase. The oil, water and gas phases each have a level in the monitoring wellbore which substantially corresponds to the level of the oil, water and gas zones, respectively, in the reservoir proximal to the monitoring wellbore.

In one embodiment, the method comprises positioning a transducer pair having a first transducer and a second transducer in the oil phase of the monitoring wellbore and performing a short-term transient monitoring sequence during a short-term time interval. The short-term transient monitoring sequence comprises transmitting a plurality of first acoustic output signals from the first transducer in a first direction while simultaneously transmitting a plurality of second acoustic output signals from the second transducer in a second direction. A distance marker is positioned in the monitoring wellbore and is contacted with one of the first or second acoustic output signals. The distance marker reflects a reference input signal back to the first or second transducer in response to contact with the first or second acoustic output signal. The temperature and pressure of the monitoring wellbore are continuously determined at the position of the transducer pair and the first or second transducer is calibrated using the resulting temperature and pressure measurements and the reference input signal.

The short-term transient monitoring sequence further comprises contacting a gas/oil interface between the gas phase and the oil phase with one of the first acoustic output signals and reflecting a first acoustic input signal back to the first transducer in response to the contact. A contact level of the oil and gas zones is determined from the first acoustic input signal. A water/oil interface between the water phase and the oil phase is also contacted with one of the second acoustic output signals and a second acoustic input signal is reflected back to the second transducer in response to the contact. A contact level of the oil and water zones is determined from the second acoustic input signal.

The transducer pair is maintained in the monitoring wellbore for a plurality of short-term time intervals which, in sum, constitute a long-term monitoring period. The short-term time intervals typically have a duration of 1 to 24 hours, whereas the long-term monitoring periods typically have a duration of 36 to 48 months. A short-term transient monitoring sequence is performed anew during each short-term time interval of the long-term monitoring period to obtain a time history of the contact levels in the oil reservoir over the course of the long-term monitoring period. The time spacing between each short-term time interval may be sufficiently short such that the short-term transient monitoring sequences are performed substantially continuously throughout the long-term monitoring period. Alternatively, the time spacing between each short-term time interval may be sufficiently long such that the short-term transient monitoring sequences are performed substantially periodically throughout the long-term monitoring period with an interval of monitoring inactivity typically on the order of about 24 to 48 hours between each short-term time interval. It is noted that the transducer pair and the fluids in the monitoring wellbore are substantially static relative to the monitoring wellbore during each short-term time interval.

In a preferred embodiment, the above-recited monitoring wellbore is one of a plurality of monitoring wellbores and the above-recited transducer pair positioned therein is one of a plurality of transducer pairs. Each of the monitoring wellbores is positioned proximal to at least one production well and one transducer pair is positioned in each of the monitoring wellbores. The first and second acoustic input signals obtained from each of the transducer pairs are used to simultaneously determine the contact level of the oil and water zones and the contact level of the oil and gas zones proximal to each of the monitoring wellbores. The contact levels proximal to each of the monitoring wellbores are recorded at a single central remote location which communicates with the transducer pairs by radio telemetry. The operator at the remote central location correlates the contact levels with fluid production from the production wells.

In another embodiment of the present invention, a monitoring wellbore is provided in substantially the same manner as above. The method comprises positioning a single transducer in the water phase of the monitoring wellbore and performing a short-term transient monitoring sequence, wherein a plurality of acoustic output signals are transmitted from the transducer. A distance marker is positioned in the monitoring wellbore and is contacted with one of the acoustic output signals. The distance marker reflects a reference input signal back to the transducer in response to contact with the second acoustic output signal. The temperature and pressure of the monitoring wellbore are continuously determined at the position of the transducer and the transducer is calibrated using the resulting temperature and pressure measurements and the reference input signal.

The short-term transient monitoring sequence further comprises contacting the water/oil interface with a first of the acoustic output signals and reflecting a first acoustic input signal back to the transducer in response to the contact. A contact level of the oil and water zones is determined from the first acoustic input signal. The gas/oil interface is also contacted with a second of the acoustic output signals and a second acoustic input signal is reflected back to the second transducer in response to the contact. A contact level of the oil and gas zones is determined from the second acoustic input signal.

Similar to the earlier embodiment, the transducer is maintained in the monitoring wellbore for many short-term time intervals which constitute a long-term monitoring period. A short-term transient monitoring sequence is performed anew during each short-term time interval of the long-term monitoring period. The transducer and the fluids in the monitoring wellbore are substantially static relative to the monitoring wellbore during each short-term time interval.

In a preferred embodiment, the above-recited monitoring wellbore is one of a plurality of monitoring wellbores and the above-recited transducer positioned therein is one of a plurality of transducers. Each of the monitoring wellbores is positioned proximal to at least one production well and one transducer is positioned in each of the monitoring wellbores. The first and second acoustic input signals obtained from each transducer are used to simultaneously determine the contact level of the oil and water zones and the contact level of the oil and gas zones proximal to each of the monitoring wellbores. The contact levels proximal to each of the monitoring wellbores are recorded at a single central remote location which communicates with the transducers by radio telemetry. The operator at the remote central location correlates the contact levels with production from the production wells.

The present invention is also a tool for monitoring contact levels of fluids in a subterranean oil reservoir. The tool comprises a housing having a first end and a second end and configured for positioning in a monitoring wellbore extending from an earthen surface into the oil reservoir. The reservoir includes an oil zone, a water zone, and a gas zone, each having a level in the reservoir. The monitoring wellbore is in fluid communication with the oil, water and gas zones and contains a plurality of fluids including an oil phase, a water phase and a gas phase. The oil, water and gas phases each have a level in the monitoring wellbore which substantially corresponds to the level of the oil, water and gas zones, respectively, in the reservoir proximal to the monitoring wellbore.

The tool further comprises a transducer pair including a first transducer positioned at the first end of the housing and a second transducer positioned at the second end of the housing. The first transducer is provided for transmitting a plurality of first acoustic output signals in a first direction, receiving a first acoustic input signal reflected back to the first transducer upon contact between one of the first acoustic output signals and a first fluid interface, and converting the first acoustic input signal to a first electrical output signal. The second transducer is provided for transmitting a plurality of second acoustic output signals in a second direction, receiving a second acoustic input signal reflected back to the second transducer upon contact between one of the second acoustic output signals and a second fluid interface, and converting the second acoustic input signal to a second electrical output signal. The tool also includes a signal processing module positioned in the housing. The signal processing module has electronic circuitry for receiving the first and second electrical output signals and conditioning the first and second electrical output signals to produce first and second processed data signals, respectively.

The tool has a control unit at the earthen surface and a support line extending from the control unit through the monitoring wellbore to the housing. A distance marker is positioned on the support line proximal to the housing for calibrating the first or second transducer by contacting the distance marker with one of the first or second acoustic output signals and reflecting a reference input signal back to the first or second transducer in response to contact. The signal processing module is in electrical communication with the control unit by means of an electrical conductor in the support line. The control unit is provided with radio telemetry enabling transmission of the first and second processed data signals or reservoir contact level data signals generated by the tool to a remote location.

The invention will be further understood from the accompanying drawings and description.

BRIEF DESCRIPTION OF THE DRAWINGS

FIG. 2 is a schematic view of the tool of FIG. 1 positioned in a monitoring wellbore in accordance with a first embodiment of the method of the present invention.

FIG. 3 is a schematic view of the tool of FIG. 1 positioned in a monitoring wellbore in accordance with a second embodiment of the method of the present invention.

DESCRIPTION OF PREFERRED EMBODIMENTS

Figure 1:
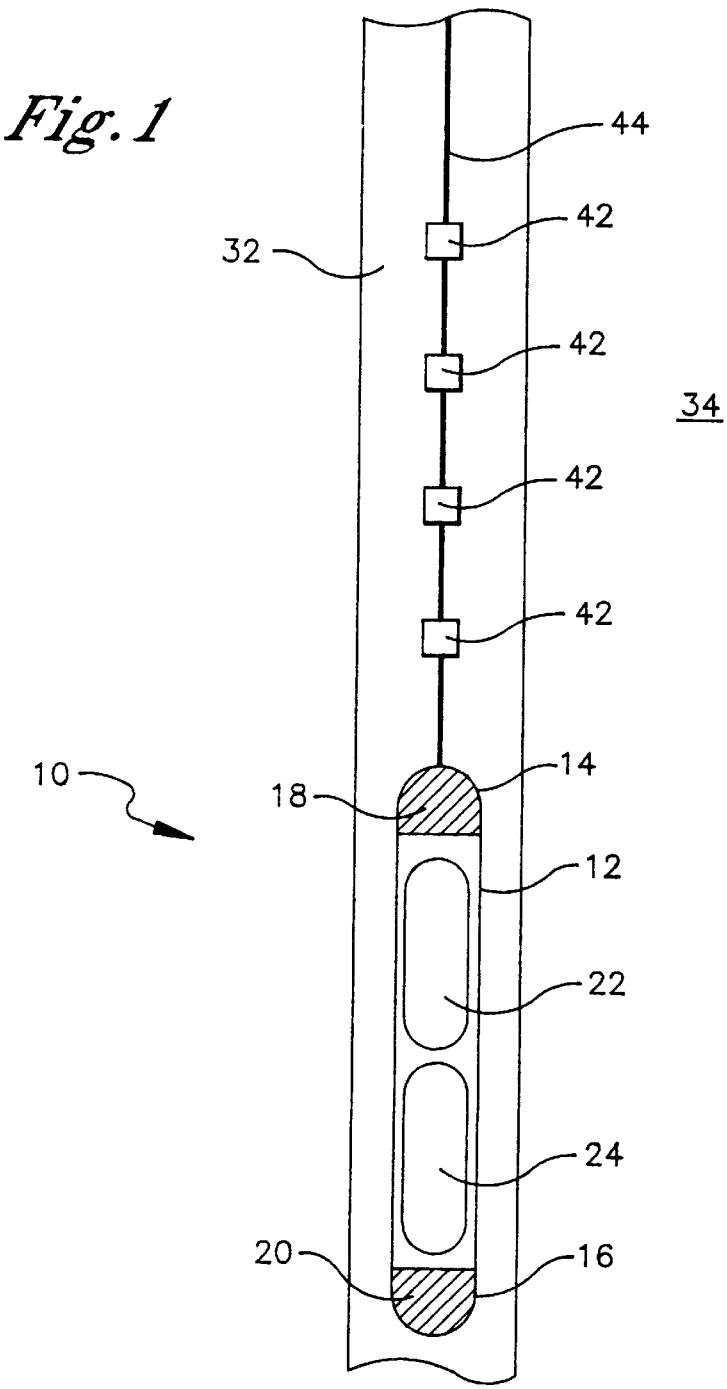
FIG. 1 is schematic view of a reservoir contact monitoring tool having utility in the method of the present invention.

Referring to FIG. 1, a reservoir contact monitoring tool having utility in the method of the present invention is shown and generally designated 10. The tool 10 comprises a housing 12 which encloses a plurality of operational modules. The housing 12 has an upper end 14 and a lower end 16 arranged in an elongate tubular configuration to facilitate placement of the housing 12 in a relatively narrow wellbore in a manner described hereafter. As such, the housing 12 typically has a length from the upper end 14 to the lower end 16 in a range of about 1 to 2 meters and has a substantially uniform outside diameter in a range of about 3 to 8 cm.

The operational modules include an upper acoustic transducer 18 and a lower acoustic transducer 20 which are positioned in the upper and lower ends 14, 16 of the housing 12, respectively. The upper and lower acoustic transducers 18, 20 are capable of receiving electrical input signals, converting the electrical input signals to high energy acoustic output signals, and transmitting the resulting high energy acoustic output signals into the environment surrounding the housing 12. The upper and lower acoustic transducers 18, 20 are further capable of receiving low energy acoustic input signals from the surrounding environment and converting the low energy acoustic input signals to electrical output signals. The upper and lower acoustic transducers 18, 20 are preferably piezo transducers.

The remaining operational modules in the housing 12 are a temperature/pressure measuring module 22 and a signal processing module 24. The operational modules 22, 24 are intermediately positioned in the housing 12 between the upper and lower acoustic transducers 18, 20. The temperature/pressure measuring module 22 comprises temperature and pressure detectors for continuously determining the temperature and pressure of the surrounding environment and transmitting the resulting temperature and pressure data signals to the signal processing module 24. The signal processing module 24 comprises electronic circuitry for receiving the temperature and pressure data signals from the temperature/pressure measuring module 22 and for receiving the electrical output signals from the upper and lower acoustic transducers 18, 20 and conditioning the signals to produce processed data signals which are substantially in the form of sonograms suitable for transmission. The electronic circuitry of the signal processing module 24 is further capable of transmitting the processed data signals from the housing 12 to a remote position and receiving control signals from the remote position and communicating the control signals to the other operational modules 18, 20, 22. It is apparent that electronic communication links (not shown) are provided which network the operational modules 18, 20, 22, 24.

A control unit 28 is remotely located relative to the housing 12. The control unit 28 is typically positioned on an earthen surface 30 at the head of a monitoring wellbore 32 penetrating an oil reservoir 34 alternately termed an oil-bearing formation. The housing 12 is positioned beneath the earthen surface 30 within the monitoring wellbore 32. The control unit 28 contains electronics capable of receiving the processed data signals from the signal processing module 24 and retransmitting the processed data signals to a central management office 36 having a human operator and/or an operations computer. The central management office 36 is typically positioned a remote distance extending up to many miles from the control unit 28. The electronics of the control unit 28 is further capable of generating the control signals or electrical input signals in response to instruction signals from the central management office 36 and transmitting the control signals or electrical input signals to the housing 12. The control unit 28 includes radio telemetry 38 which provides a cellular communications link between the central management office 36 and the tool 10. In an alternate embodiment, the electronics of the control unit 28 are capable of processing the processed data signals to produce reservoir contact level data signals which the control unit 28 transmits to the central management office 36 via the radio telemetry 38.

A support line 40 extends through the monitoring wellbore 32 from the surface position of the control unit 28 to the subterranean position of the housing 12. The support line 40 includes an electrical conductor which enables electrical communication between the control unit 28 and signal processing module 24. A plurality of distance markers 42 are periodically positioned, typically at intervals of about 3 to 4 meters, along the lower length 44 of the support line 40 proximal to the housing 12. The distance markers 42 are acoustic reflectors in the form of filaments which are capable of reflecting the high energy acoustic output signals transmitted from the housing 12 back to the housing 12 as reference input signals.

A first method of operating the reservoir contact monitoring tool 10 is described hereafter with reference to FIGS. 1 and 2. The monitoring wellbore 32 is shown to extend from the earthen surface 30 through the oil reservoir 34 which has a plurality of fluid zones. The zones include an oil zone 46 alternately termed a producing zone, an underlying water zone 48 alternately termed an aquifer, and an overlying gas zone 50 alternately termed a gas cap. The monitoring wellbore 32 is in fluid communication with the zones 46, 48, 50 via perforated casing or alternatively is uncased and fully open to the zones 46, 48, 50 across the wellbore face. The monitoring wellbore 32 may be an existing production wellbore, but is preferably a separate wellbore drilled proximal to one or more existing production wells which is dedicated exclusively to the monitoring function described herein. The dedicated monitoring wellbore 32 is generally narrower than a production wellbore, requiring only sufficient diameter to receive the housing 12 to a desired depth. As such, the dedicated monitoring wellbore 32 typically has an inside diameter from about 12 to 28 cm.

The method is initiated by feeding the support line 40 having the housing 12 attached to the lower end 44 into the monitoring wellbore 32. The support line 40 is played out until the housing 12 is suspended in the oil phase 52 residing in the monitoring wellbore 32. The level of the oil phase 52 in the monitoring wellbore 32 corresponds substantially identically to the level of the oil zone 46 in the reservoir 34 surrounding the monitoring wellbore 32. The practitioner can estimate the level of the oil phase 52 for positioning the housing 12 therein using production well logs from the adjacent production wells. Alternatively, the practitioner can use the tool 10 itself to determine the level of the oil phase 52 for positioning the housing 12 therein.

Upon positioning the housing 12 in the oil phase 52, the housing 12 is maintained substantially static in the monitoring wellbore 32 at least during the relatively short-term time interval when the short-term transient monitoring sequence is being performed. The short-term time interval is typically on the order of about 1 to 24 hours. Changes in the level of the oil phase 52 due to production from adjacent production wells is typically a long-term occurrence only detectable over the course of many days. Thus, it is generally only necessary modify the position of the housing 12 if there are significant long-term changes in the level of the oil phase 52.

The tool 10 is activated by communicating an activation instruction signal from the central management office 36 to the control unit 28 via the cellular communications link 38. The control unit 28 generates a plurality of pulsed electrical input signals in response to the activation instruction signal and transmits the electrical input signals to the upper and lower acoustic transducers 18, 20 via the electrical conductor of the support line 40. The upper and lower acoustic transducers 18, 20 convert the electrical input signals to high energy acoustic output signals in a range greater than about 10 kHz and less than about 1000 kHz and preferably in a range of about 100 to 300 kHz. Operability of method is not limited by the exact frequency of the high energy acoustic output signals. However, selecting signals within the preferred frequency range results in both an acceptable resolution and an acceptable travel distance of the signal. Increasing the frequency beyond the preferred range increases resolution but tends to unacceptably limit the effective travel distance of the signal, while decreasing the frequency below beyond the preferred range increases the effective travel distance of the signal but tends to unacceptably limit the resolution.

The upper and lower acoustic transducers 18, 20 transmit the high energy acoustic output signals designated by the upper and lower thick arrows in opposite directions out into the wellbore 32 through the surrounding the oil phase 52. A portion of the high energy acoustic output signals transmitted from the upper acoustic transducer 18 is reflected back to the upper acoustic transducer 18 as reference input signals by the distance markers 42, which are positioned along the support line 40 at known distance intervals from the housing 12. The signal processing module 24 processes the reference input signals and correlates the signals with temperature and pressure data signals continuously provided by the temperature/pressure measuring module 22 to calibrate the tool 10.

The portion of the high energy acoustic output signals transmitted by the upper acoustic transducer 18 which is not reflected back to the upper acoustic transducer 18 by the distance markers 42 continues to the interface 54 between the oil phase 52 and the gas phase 56. The level of the gas phase 56 in the monitoring wellbore 32 corresponds substantially identically to the level of the gas zone 50 in the oil reservoir 34 surrounding the monitoring wellbore 32. Since the gas phase 56 has a different acoustic impedance than the oil phase 52, the gas/oil interface 54 is a boundary of acoustic impedance transition which reflects the high energy acoustic output signals back to the upper acoustic transducer 18 as first low energy acoustic input signals designated by the upper thin arrow. The first low energy acoustic input signals have substantially the same frequency as the high energy acoustic output signals, but have a substantially lower intensity. The upper acoustic transducer 18 converts the first low energy acoustic input signals to first electrical output signals and transmits the first electrical output signals to the signal processing module 24. The signal processing module 24 receives the first electrical output signals and conditions them for transmission to the control unit 28 as first processed data signals. The first processed data signals are essentially in the form of sonograms.

While the tool 10 is generating the first processed data signals using the high energy acoustic output signals from the upper acoustic transducer 18, the tool 10 is simultaneously generating second processed data signals in a substantially similar manner using the high energy acoustic output signals from the lower acoustic transducer 20. In particular, the high energy acoustic output signals, which are transmitted by the lower acoustic transducer 20 in a direction opposite those transmitted by the upper acoustic transducer 18, continue to the interface 58 between the oil phase 52 and the water phase 60. The level of the water phase 60 in the monitoring wellbore 32 corresponds substantially identically to the level of the water zone 48 in the reservoir 34 surrounding the monitoring wellbore 32. Since the water phase 60 has a different acoustic impedance than the oil phase 52, the water/oil interface 58 is likewise a boundary of acoustic impedance transition which reflects the high energy acoustic output signals back to the lower acoustic transducer 20 as second low energy acoustic input signals designated by the lower thin arrow. The second low energy acoustic input signals have substantially the same frequency as the high energy acoustic output signals, but have a substantially lower intensity. The lower acoustic transducer 20 converts the second low energy acoustic input signals to second electrical output signals and transmits the second electrical output signals to the signal processing module 24. The signal processing module 24 receives the second electrical output signals and conditions them for transmission to the control unit 28 as second processed data signals. The second processed data signals are essentially in the form of sonograms.

The signal processing module 24 transmits the first and second processed data signals through the monitoring wellbore 32 to the control unit 28 on the earthen surface 30 by means of the electrical conductor of the support line 40. The control unit 28 receives the first and second processed data signals from the signal processing module 24 and responds in accordance with one of two alternate embodiments. According to one embodiment, the control unit 28 retransmits the first and second processed data signals to the central management office 36 by means of the cellular communications link of the radio telemetry 38. The operations computer at the central management office 36 uses the first processed data signal to calculate the time of flight of the first low energy acoustic input signals from the gas/oil interface 54 to the upper acoustic transducer 18. The time of flight is used along with the calibration data to calculate the level of the gas/oil interface 54 in the monitoring wellbore 32. The level of the gas/oil interface 54 corresponds substantially identically to the level of oil zone 46 contact with the gas zone 50 in the surrounding reservoir 34. The operations computer simultaneously uses the second processed data signal to calculate the time of flight of the second low energy acoustic input signals from the water/oil interface 58 to the lower acoustic transducer 20. The time of flight is used along with the calibration data to calculate the level of the water/oil interface 58 in the monitoring wellbore 32. The level of the water/oil interface 58 corresponds substantially identically to the level of oil zone 46 contact with the underlying water zone 48 in the surrounding reservoir 34.

According to the other embodiment, the electronics of the control unit 28 are capable of simultaneously determining the gas/oil reservoir contact level and the water/oil reservoir contact level in substantially the same manner as described above with respect to the operations computer of the central management office 36. Thus, the control unit 28 receives the first and second processed data signals from the signal processing module 24 and computes the gas/oil and water/oil reservoir contact levels. The resulting reservoir contact level data signals are transmitted from the control unit 28 to the central management office 36 using the radio telemetry 38 for analysis by the operator or operations computer or for storage in the memory of the operations computer.

It is noted that the fluids in the monitoring wellbore 32, particularly in the case of a dedicated monitoring wellbore, are substantially static during the relatively short-term time intervals when the short-term transient monitoring sequence is being performed. As described above, movement of fluids in the monitoring wellbore 32, i.e., oil phase 52, gas phase 56, or water phase 60, is typically a long-term occurrence in response to changes in the levels of the oil zone 46, water zone 48, or gas zone 50 due to production from one or more adjacent production wells.

A second method of operating the reservoir contact monitoring tool 10 may be performed as an alternate embodiment to the first method of operation described above. The second method of operation is described hereafter with reference to FIGS. 1 and 3, wherein elements common to FIGS. 2 and 3 are designated by the same reference characters. The second method of operation is substantially the same as the first method except that the housing 12 is passed through the oil phase 52 and suspended in the water phase 60. The second method has utility when the height of the oil phase 52 is relatively small approaching the length of the housing 12, and particularly when the height of the oil phase 52 is less than the length of the housing 12, preventing the entire housing 12 from being positioned in the oil phase 52. The second method also does not typically require the operator to modify the position of the housing 12, even during long-term monitoring. In accordance with the second method, the housing 12 can be positioned at a location in the monitoring wellbore 32 where the housing 12 is likely to remain in the water phase 60 throughout the entire monitoring period even if there are significant changes in the level of the oil phase 52.

In accordance with the second method of operation, the tool 10 is activated by communicating the activation instruction signal from the central management office 36 to the control unit 28. The control unit 28 generates a plurality of pulsed electrical input signals in response to the activation instruction signal. However, the control unit 28 only transmits the electrical input signals to the upper acoustic transducer 18. The lower acoustic transducer 20 remains deactivated throughout the second method of operation. The upper acoustic transducer 18 converts the electrical input signals to high energy acoustic output signals and transmits the high energy acoustic output signals designated by the thick arrows in one direction out into the wellbore 32 through the surrounding the water phase 60. A portion of the high energy acoustic output signals transmitted from the upper acoustic transducer 18 is reflected back to the upper acoustic transducer 18 as reference input signals by the distance markers 42. The acoustic signal processing module 24 processes the reference input signals and correlates the signals with the temperature and pressure data signals to calibrate the tool 10.

The portion of the high energy acoustic output signals transmitted by the upper acoustic transducer 18 which is not reflected back to the upper acoustic transducer 18 by the distance markers 42 continues to the water/oil interface 58. The water/oil interface 58 reflects a fraction of the high energy acoustic output signals back to the upper acoustic transducer 18 as first low energy acoustic input signals designated by the shorter thin arrow. The upper acoustic transducer 18 converts the first low energy acoustic input signals to first electrical output signals and transmits the first electrical output signals to the signal processing module 24. The signal processing module 24 receives the first electrical output signals and conditions them for transmission to the control unit 28 as first processed data signals. The first processed data signals are essentially in the form of sonograms.

While the tool 10 is generating the first processed data signals using the high energy acoustic output signals reflected by the water/oil interface 58, the tool 10 is simultaneously generating second processed data signals in a substantially similar manner using the high energy acoustic output signals which pass through the water/oil interface 58 and continue to the gas/oil interface 54. The gas/oil interface 54 reflects the high energy acoustic output signals contacting the gas/oil interface 54 back to the upper acoustic transducer 18 as second low energy acoustic input signals designated by the longer thin arrow. The upper acoustic transducer 18 converts the second low energy acoustic input signals to second electrical output signals and transmits the second electrical output signals to the signal processing module 24. The signal processing module 24 receives the second electrical output signals and conditions them for transmission to the control unit 28 as second processed data signals. The second processed data signals are essentially in the form of monograms.

The signal processing module 24 transmits the first and second processed data signals through the monitoring wellbore 32 to the control unit 28 on the earthen surface 30 by means of the electrical conductor of the support line 40. The control unit 28 receives the first and second processed data signals from the signal processing module 24 and responds in accordance with one of the two alternate embodiments described above.

The method of the present invention, in accordance with either of its above-described embodiments, has specific utility to mature depleted oil reservoirs covering an expansive area and having a large number of production wells. Reservoir contact levels are an important parameter used to effectively manage such reservoirs. The method enables cost-effective automated continuous remote monitoring of reservoir contact levels over substantially the entire reservoir by positioning a plurality of reservoir contact monitoring tools throughout the oil reservoir at predetermined locations correlated to the position of the production wells. The tools are maintained for long-term monitoring periods with a minimum of maintenance or operator interaction and can be controlled and read by a single operator at a remote central management office. The operator uses the reservoir contact level data acquired in accordance with the present method to set localized oil production rates for different production wells in the reservoir as a function of localized reservoir contact levels. As a result, oil production from the reservoir can be optimized to extend the producing life of the reservoir.

The following example demonstrates the scope and utility of the present invention, but are not to be construed as limiting the scope thereof.

EXAMPLE

A monitoring wellbore is provided several meters from an oil production well. The monitoring wellbore has a diameter of 15 cm and traverses an oil reservoir to a depth of 457 meters from the surface. The oil reservoir includes an oil zone, an underlying aquifer and an overlying gas cap. A housing for the contact monitoring tool of the present invention is positioned in the oil phase residing in the monitoring wellbore at a level of 305 meters. The level of the oil phase corresponds identically to the level of the oil zone in the surrounding reservoir.

An upper transducer transmits a plurality of first high energy acoustic output signals in a generally upward direction while a lower transducer transmits a plurality of second high energy acoustic output signals in a generally downward direction. The first and second high energy acoustic output signals have a frequency of 175 kHz. A plurality of distance markers are positioned in the monitoring wellbore along the support line at intervals of 3 meters leading upward away from the housing. One of the distance markers is contacted with one of the first high energy acoustic output signals and a reference input signal back is reflected back to the upper transducer in response to contact with the distance marker. The tool continuously measures the temperature and pressure of the monitoring wellbore at the position of the housing and the transducers are calibrated from the resulting temperature and pressure measurements and the reference input signal.

A gas/oil interface between the gas phase and the oil phase is also contacted with a first high energy acoustic output signal and a first low energy acoustic input signal is reflected back to the upper transducer in response to the contact. A contact level of the oil and gas zones is determined from the first low energy acoustic input signal to be 25 meters above the tool. A water/oil interface between the water phase and the oil phase is contacted with a second high energy acoustic output signal and a second acoustic input signal is reflected back to the lower transducer in response to the contact. A contact level of the oil and water zones is determined from the second low energy acoustic input signal to be 20 meters below the tool. The upper and lower transducers are continuously maintained in the monitoring wellbore during a long-term monitoring period of 48 months and determination of the contact levels is periodically repeated every day throughout the long-term monitoring period.

While the foregoing preferred embodiments of the invention have been described and shown, it is understood that alternatives and modifications, such as those suggested and others, may be made thereto and fall within the scope of the present invention.

We claim:

1. A method for monitoring contact levels of fluids in an oil reservoir comprising:

providing a monitoring wellbore from an earthen surface into a subterranean reservoir having a plurality of fluid zones including an oil zone, a water zone, and a gas zone, each said fluid zone having a vertical level in said reservoir, wherein said monitoring wellbore is in fluid communication with said oil zone, water zone, and gas zone and said monitoring wellbore contains a plurality of substantially continuous discrete fluid phases including an oil phase, a water phase and a gas phase, each said fluid phase occupying a substantially continuous volume of said monitoring wellbore having a position at a different vertical level to one another, said vertical levels of said oil phase, said water phase and said gas phase substantially corresponding to said vertical levels of said oil zone, said water zone and said gas zone, respectively, in said reservoir;

positioning a transducer pair having a first and a second transducer in said oil phase of said monitoring wellbore;

transmitting a plurality of first acoustic output signals from said first transducer in a first direction;

contacting a gas/oil interface between said gas phase and said oil phase with one of said first acoustic output signals;

reflecting a first acoustic input signal back to said first transducer in response to said contact with said gas/oil interface;

determining a contact level of said oil zone and said gas zone from said first acoustic input signal;

transmitting a plurality of second acoustic output signals from said second transducer in a second direction;

contacting a water/oil interface between said water phase and said oil phase with one of said second acoustic output signals;

reflecting a second acoustic input signal back to said second transducer in response to said contact with said water/oil interface; and determining a contact level of said oil zone and said water zone from said second acoustic input signal.

2. The method of claim 1 wherein said position of said vertical level of each said fluid phase in said monitoring wellbore is substantially static relative to said monitoring wellbore while said contact level of said oil zone and said gas zone and said contact level of said oil zone and said water zone are determined in said reservoir.

3. The method of claim 1 wherein said transducer pair is maintained substantially static relative to said monitoring wellbore while said contact level of said oil zone and said gas zone and said contact level of said oil zone and said water zone in said reservoir are determined in said reservoir.

4. The method of claim 1 further comprising providing a plurality of said monitoring wellbores, positioning a plurality of said transducer pairs in each of said monitoring wellbores and using each of said transducer pairs to determine said contact level of said oil zone and said water zone and said contact level of said oil zone and said gas zone proximal to each of said monitoring wellbores.

5. The method of claim 4 further comprising transmitting contact level data from said monitoring wellbore to a single central remote location.

6. The method of claim 5 wherein said contact level data is transmitted to said central remote location by radio telemetry.

7. The method of claim 4 wherein each of said monitoring wellbores is positioned proximal to at least one production well.

8. The method of claim 7 further comprising correlating production from said at least one production well to said contact levels.

9. The method of claim 1 wherein the time elapsed while determining said contact levels defines a short-term time interval and said transducer pair is continuously maintained in said monitoring wellbore during a long-term monitoring period defined by a plurality of said short-term time intervals, determination of said contact level of said oil zone and said gas zone and said contact level of said oil zone and said water zone in said reservoir being repeated throughout said long-term monitoring period.

10. The method of claim 1 further comprising positioning a distance marker in said monitoring wellbore and calibrating said first or second transducer by contacting said distance marker with one of said first or second acoustic output signals and reflecting a reference input signal back to said first or second transducer in response to said contact with said distance marker.

11. The method of claim 1 wherein said monitoring wellbore is a dedicated monitoring wellbore.

12. A method for monitoring contact levels of fluids in an oil reservoir comprising:

providing a monitoring wellbore from an earthen surface into a subterranean reservoir having a plurality of fluid zones including an oil zone, a water zone, and a gas zone, each said fluid zone having a vertical level in said reservoir, wherein said monitoring wellbore is in fluid communication with said oil zone, water zone, and gas zone and said monitoring wellbore contains a plurality of substantially continuous discrete fluid phases including an oil phase, a water phase and a gas phase, each said fluid phase occupying a substantially continuous volume of said monitoring wellbore having a position at a different vertical level to one another, said vertical levels of said oil phase, said water phase and said gas phase substantially corresponding to said vertical levels of said oil zone, said water zone and said gas zone, respectively, in said reservoir;

positioning a transducer in said water phase of said monitoring wellbore;

transmitting a plurality of acoustic output signals from said transducer;

contacting a water/oil interface between said water phase and said oil phase with a first of said acoustic output signals;

reflecting a first acoustic input signal back to said transducer in response to said contact with said water/oil interface;

determining a contact level of said oil zone and said water zone from said first acoustic input signal;

contacting a gas/oil interface between said gas phase and said oil phase with a second of said acoustic output signals;

reflecting a second acoustic input signal back to said second transducer in response to said contact with said gas/oil interface; and determining a contact level of said oil zone and said gas zone from said second acoustic input signal.

13. The method of claim 12 wherein said position of said vertical level of each said fluid phase in said monitoring wellbore is substantially static relative to said monitoring wellbore while said contact level of said oil zone and said gas zone and said contact level of said oil zone and said water zone are determined in said reservoir.

14. The method of claim 12 wherein said transducer is maintained substantially static relative to said monitoring wellbore while said contact level of said oil zone and said gas zone and said contact level of said oil zone and said water zone in said reservoir are determined in said reservoir.

15. The method of claim 12 further comprising providing a plurality of said monitoring wellbores, positioning a plurality of said transducers in each of said monitoring wellbores and using each of said transducers to determine said contact level of said oil zone and said water zone and said contact level of said oil zone and said gas zone proximal to each of said monitoring wellbores.

16. The method of claim 15 further comprising transmitting contact level data from said monitoring wellbore to a single central remote location.

17. The method of claim 16 wherein said contact level data is transmitted to said central remote location by radio telemetry.

18. The method of claim 15 wherein each of said monitoring wellbores is positioned proximal to at least one production well.

19. The method of claim 18 further comprising correlating production from said at least one production well to said contact levels.

20. The method of claim 12 wherein the time elapsed while determining said contact levels defines a short-term time interval and said transducer is continuously maintained in said monitoring wellbore during a long-term monitoring period defined by a plurality of said short-term time intervals, determination of said contact level of said oil zone and said gas zone and said contact level of said oil zone and said water zone in said reservoir being repeated throughout said long-term monitoring period.

21. The method of claim 12 further comprising positioning a distance marker in said monitoring wellbore and calibrating said transducer by contacting said distance marker with one of said acoustic output signals and reflecting a reference input signal back to said transducer in response to said contact with said distance marker.

22. The method of claim 12 wherein said monitoring wellbore is a dedicated monitoring wellbore.

23. A tool for monitoring contact levels of fluids in an oil reservoir comprising:

a housing having a first end and a second end and configured for positioning in a monitoring wellbore extending from an earthen surface into a subterranean reservoir having a plurality of fluid zones including an oil zone, a water zone, and a gas zone, each fluid zone having a vertical level in the reservoir, wherein the monitoring wellbore is in fluid communication with the oil zone, water zone, and gas zone and the monitoring wellbore contains a plurality of substantially continuous discrete fluid phases including an oil phase, a water phase and a gas phase, each fluid phase occupying a substantially continuous volume of the monitoring wellbore having a position at a different vertical level to one another, the vertical levels of the oil phase, the water phase and the gas phase substantially corresponding to the vertical levels of the oil zone, the water zone and the gas zone, respectively, in the reservoir;

a transducer pair including a first transducer positioned at said first end of said housing and a second transducer positioned at said second end of said housing, said first transducer for transmitting a plurality of first acoustic output signals in a first direction, receiving a first acoustic input signal reflected back to said first transducer upon contact between one of the first acoustic output signals and a first fluid interface, and converting the first acoustic input signal to a first electrical output signal and said second transducer for transmitting a plurality of second acoustic output signals in a second direction, receiving a second acoustic input signal reflected back to said second transducer upon contact between one of the second acoustic output signals and a second fluid interface, and converting the second acoustic input signal to a second electrical output signal; and a signal processing module positioned in said housing having electronic circuitry for receiving the first and second electrical output signals and processing the first and second electrical output signals to produce first and second processed data signals for transmission to the earthen surface.

24. The tool of claim 23 further comprising a support line attached to said housing and extending through the monitoring wellbore to the earthen surface and a distance marker positioned on said support line for calibrating said first or second transducer by contacting said distance marker with one of the first or second acoustic output signals and reflecting a reference input signal back to said first or second transducer in response to contact with said distance marker.

25. The tool of claim 24 further comprising radio telemetry positioned at the earthen surface in electrical communication with said signal processing module by means of an electrical conductor in said support line, said radio telemetry for transmitting data signals to a remote location.

* * * * *